US006418851B1

(12) United States Patent
Hartmann et al.

(10) Patent No.: US 6,418,851 B1
(45) Date of Patent: Jul. 16, 2002

(54) TURNING BAR ARRANGEMENT

(75) Inventors: Manfred Wolfgang Hartmann, Elfershausen; Horst Bernhard Michalik, Höchberg, both of (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 09/786,340

(22) PCT Filed: Sep. 1, 1999

(86) PCT No.: PCT/DE99/02722

§ 371 (c)(1),
(2), (4) Date: Mar. 9, 2001

(87) PCT Pub. No.: WO00/13901

PCT Pub. Date: Mar. 16, 2000

(30) Foreign Application Priority Data

Sep. 9, 1998 (DE) ........................................ 198 41 171

(51) Int. Cl.[7] .......................... B41F 21/12; G03B 1/56; B41L 35/14

(52) U.S. Cl. ...................... 101/485; 101/488; 101/247; 226/91; 226/197

(58) Field of Search .......................... 101/92, 485, 247, 101/488, 228; 226/615.12, 197, 91

(56) References Cited

U.S. PATENT DOCUMENTS

| | | | | |
|---|---|---|---|---|
| 3,734,487 A | | 5/1973 | Treff | |
| 4,154,386 A | * | 5/1979 | Kawada | 226/91 |
| 4,610,198 A | * | 9/1986 | Raymond | 101/247 |
| 5,108,022 A | * | 4/1992 | Birkmair et al. | 226/197 |
| 5,357,859 A | * | 10/1994 | Eckert | 101/228 |
| 5,526,748 A | * | 6/1996 | Schienz et al. | 101/488 |

FOREIGN PATENT DOCUMENTS

| | | |
|---|---|---|
| EP | 0 785 069 | 7/1997 |
| FR | 788 970 | 10/1935 |

* cited by examiner

*Primary Examiner*—Andrew H. Hirshfeld
*Assistant Examiner*—Marvin P. Crenshaw
(74) *Attorney, Agent, or Firm*—Jones, Tullar & Cooper, PC

(57) ABSTRACT

A turning bar arrangement for paper webs in a web-fed printing machine provides a compact and space-saving construction. A pair of turning bars are connected to each other while forming an acute angle and are mounted so that they can be displaced in a first plane of the turning device. A second similar arrangement of turning bars is provided in a second plane of the turning device.

10 Claims, 2 Drawing Sheets

TURNING BAR ARRANGEMENT

FIELD OF THE INVENTION

The present invention relates to an arrangement for changing the direction or course of travel of webs of material, such as paper webs. Two turning bars are located on each of two levels. The two turning bars on each level have axes that intersect.

DESCRIPTION OF THE PRIOR ART

A turning bar arrangement is disclosed in FR-PS 788 970, wherein two turning bars are arranged at right angles on one level. It is intended by this arrangement to reverse a running paper web by 180° in order to be able to set a lateral register.

U.S. Pat. No. 3,734,487 shows a device for changing the course or direction of travel of paper webs by turning bars. To this end, respectively two turning bars are arranged in a triangular shape, and their common tip points in the same direction.

SUMMARY OF THE INVENTION

The object of the present invention is based on providing a device for changing the direction of travel or course of webs of material.

In accordance with the present invention, this object is attained by providing two turning bars located on each of an upper and a lower level. The longitudinal axes of the two turning bars on each level enclose an angle and intersect at a point and form a tip. These tips or points of intersection are oriented in opposite directions on the two levels.

The advantages which can be achieved by the present invention reside, in particular, in that a change in the course or travel direction of webs of material, for example paper webs, such as a preprogrammable changing of their path, and the presetting of the position of the turning rods involved, becomes possible by the device in accordance with the present invention. Moreover, it is possible, for example, to approach the turning bars of the device selectively from above, from below, from the right or the left, i.e. from all sides. For this, one turning device is required for a change in the paper web direction by 90°, and two turning devices arranged one above the other are required for a change in the paper web position, i.e. a change, for example, from the so-called drive side or side II of the press to the so-called service side or side I of the press. “Tipping” of the paper webs by utilization of a known, so-called bay window device, is also possible. Since there is no more need to relocate a turning bar, its elaborate adjustment is moreover omitted. The turning bar arrangement requires little structural space, so that the structural height for the turning cover can be reduced.

BRIEF DESCRIPTION OF THE DRAWINGS

A preferred embodiment of the present invention is represented in the drawings and will be described in greater detail in what follows.

DESCRIPTION OF THE PREFERRED EMBODIMENT

Figure 1:
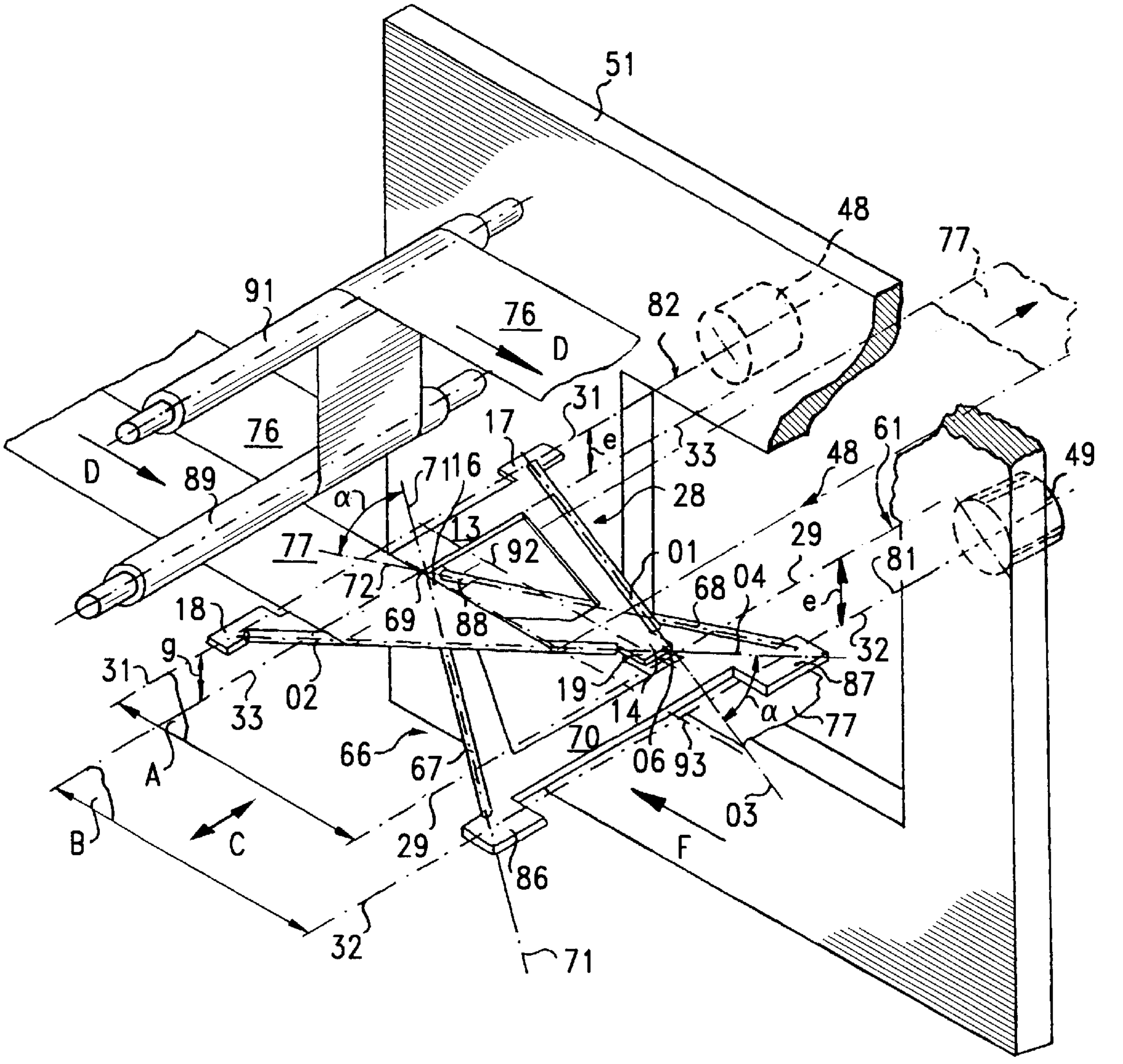
FIG. 1 shows a perspective schematic representation of two different upper and lower turning devices arranged on horizontal levels located one on top of the other with the turning bars on each level intersecting at an acute angle.
Figure 2:
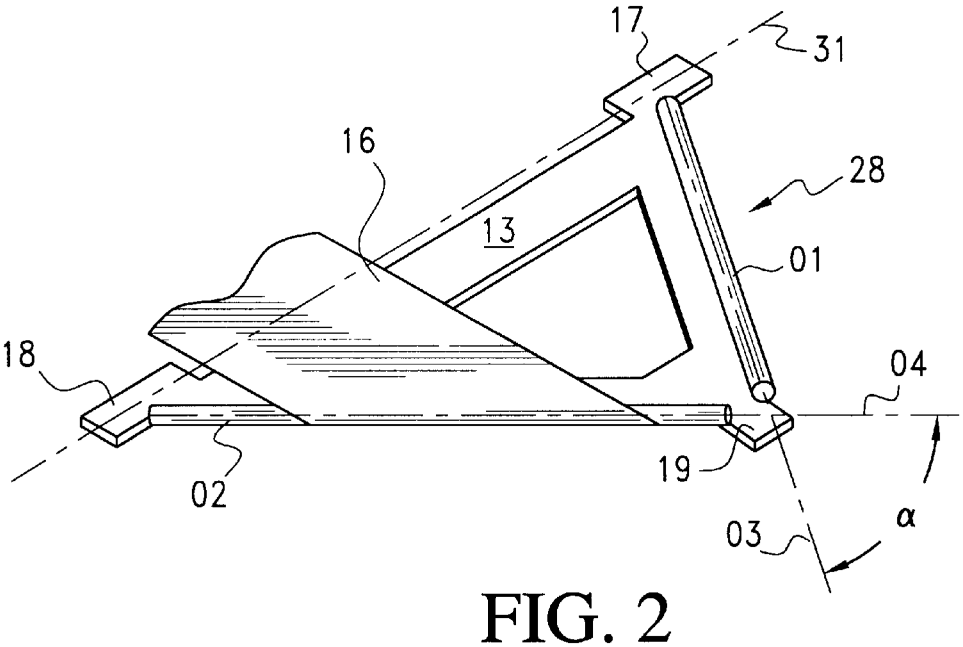
FIG. 2 is a schematic representation of the upper level turning bars and showing them intersecting at right angles, it being understood that the lower turning bars could be similarly oriented.
Figure 3:
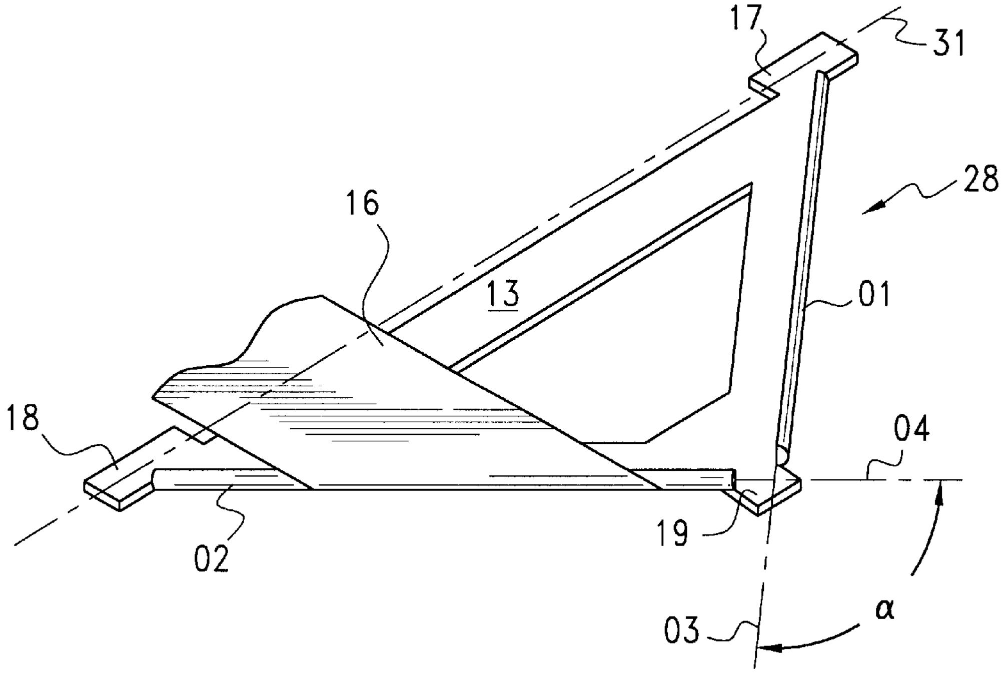
FIG. 3 is a view similar to FIG. 2 and showing the upper level turning bars intersecting at an obtuse angle.

Referring initially to FIG. 1, two paper web course-changing elements, for example in the form of so-called turning bars 01, 02 are arranged, for example in a web-fed rotary printing press, on an upper horizontal level A in such a way that the extensions of their longitudinal axes 03, 04 intersect at an angle α. While FIG. 1 shows angle α as an acute angle, it will be understood that angle α could be, for example of 85° to 95°, at an intersection point 06 or upper tip 14. The two upper level turning bars 01, 02 have, for example at their circumference, evenly distributed outlet openings for blown or compressed air. Each one of the two upper level turning bars 01, 02 forms a leg, respectively enclosed by the angle α of, for example, 85° to 95°, of an upper frame 13 with a tip 14. The upper frame 13 has three corner points, each of which is fastened on a support plate 17, 18, 19. FIG. 2 shows a similar arrangement of turning bars 01, 02 intersecting at a right angle α while FIG. 3 shows the intersection of turning bars 01, 02 at an obtuse angle α. In FIGS. 1 and 2, the turning bars 01, 02 are circular in cross-section while in FIG. 3 they are semicircular.

A sliding bushing, or a bushing with an inner thread, which is not specifically shown, is attached, for example on the bottom, to each of the support plates 17 to 19. Each of the bushings has been threaded on a guide element, for example a guide rod or guide rail 29, 31, or a threaded spindle, and is movable. The bushings of the support plates 17, 18 are carried or supported on the straight guide element 31, whereas the bushing of the support plate 19 are carried or supported on the guide element 29.

The device composed of the elements 01, 02, 13, 17 to 19 is called the upper turning bar device 28, or the upper triangular turning carriage 28. Its tip 14 points in the running direction D of webs of material, for example partial paper webs 77, 76 prior to their entry into the upper turning bar device 28.

The guide elements 29, 31 are fastened in the interior of lateral frames 51 of the turning device. Only the lateral frame 51 is represented in the sole drawing figure.

If the threaded spindle 29 or 31 is not simultaneously used as a straight guide element, the support plates 17, 18, or 19, are guided on an additional rail guide or straight guide, which fixed in place on the lateral frame and is provided as, for example, a dovetailed guide.

The upper turning bar device 28 can be reciprocally moved in a displacement direction C, i.e. horizontally transversely in relation to the web running direction D, by a linear drive mechanism 61 driven by an upper motor 48. Such a linear drive mechanism 61 can consist of a threaded spindle, fixed in place in lateral frames 51 and rotatably seated, whose screw thread meshes with the interior threads of the bushings, supporting and connected to the respective support plates 17, 18, 19. A motor 48, whose direction of rotation is reversible and which is flanged to the outside of the lateral frame 51, is used as the drive mechanism.

An electronic position indicator is at the same time attached to the motor 48, or is located at the end of the threaded spindle 29 or 31, for determining the position of the turning device 28.

In addition, a lower turning bar device 66 is provided, which in principle is of identical construction to the upper turning bar device 28. In contrast to the upper turning bar device 28, whose tip 14 points in the running direction D, the tip 16 of the lower turning bar device 66 points opposite the running direction D.

The lower turning bar device 66 defines a lower horizontal level B extending below the upper level A. The levels A and B can be parallel, and spaced apart from each other at a distance e, for example of 100 to 250 mm. These two levels A and B can also be inclined toward or away from each other, having an opening in, or opposite to the running direction D.

The lower turning bar device 66 also consists of two paper web reversing elements arranged at an angle α, for example of 85° to 95°, in respect to each other and preferably being provided in the form of so-called lower turning bars 67, 68, and is displaceable in the same manner as the upper turning bar device 28 and, like it, has a triangular frame 70, which also has support plates 86, 87, 88 at each of its corner points. The lower turning bar device 66 is displaceably seated via sliding bushings or threaded bushings fastened on support plates 86, 87, 88 in cooperation with guide tracks of straight guide elements, for example support rails 78, 79, 81. Dovetailed guides or driven threaded spindles, for example, are suitable guides. If the threaded spindle is not used as a straight guide element at the same time, the support plates 86, 87, 88 are guided on an additional guide rail, such as a straight guide which is fixed in place on the lateral frames, for example a dovetailed guide.

For driving the lower triangular frame 70, for example by use of a threaded spindle, a linear drive mechanism 82 is used, which is connected with lower frame 70 in a frictional or interlocking manner and which is fixed in place on the lateral frame and is driven by a lower motor 49, whose direction of rotating is reversible. The frame 70, or the lower turning bar device 66, can be moved back and forth transversely in respect to the running direction D and can be arrested in any position.

The longitudinal axes 71, 72 of the two lower turning bars 67, 68 intersect in an intersecting point 69 or lower tip 16. This lower intersecting point or tip 16 of the longitudinal axes 71, 72 of the turning bars 67, 68 meeting at an angle α points opposite the running direction D.

The turning bar arrangement in accordance with the present invention can be employed in the following manner: a half-width left partial paper web 77 enters the upper turning bar device 28 from above and by operation of the left turning bar 02 is moved in its direction toward the right out of the turning device 28 and the lateral frame 51 at the right, as shown in dashed lines. The second half-width partial paper web 76 is guided on in its present running direction D over paper guide rollers 89, 91, which are fixed in place on the lateral frame.

After the upper turning device 28 has been displaced toward the left transversely in respect to the running direction D, the right partial paper web 76 can only be guided via the right turning bar 01 toward the left out of the lateral frames in a manner not represented in the sole drawing.

By using the turning bar arrangement in accordance with the present invention and having the upper turning device 28 and the lower turning device 66 on two spaced-apart parallel or inclined levels A and B, and by the provided displacement of at least one of the turning devices 28, 66—transversely in respect to the running direction D=in the displacement direction +C and −C—, it becomes possible—viewed opposite the running direction D—to guide the left half-width partial paper web 77 from above around the left turning bar 02 of the upper turning device 28 and from there around the right turning bar 68 of the lower turning device 66. In this way, the left partial paper web 77 is relocated underneath the right partial paper web 76, and both are further conducted in the running direction D.

It is also possible to conduct the right partial paper web 76 into a position underneath the left partial paper web 77. In this case, the left partial paper web 77 moves in the vertical direction around the lower paper guide roller 89 and then around the upper paper guide roller 91 in a horizontal running direction D out of the turning device. The right partial paper web 76 turns, from above, around the right turning bar 01, from there from above around the left turning bar 67 and from there subsequently in a horizontal direction in the running direction D below the partial paper web 77 and together with it out of the turning device. Prior to this, the lower turning device 66 and the upper turning device 28 have been appropriately horizontally displaced and oriented toward each other.

Moreover, a partial paper web 77 conducted through the lateral frame 51 can, however, be tipped again in the running direction D by means of a bay window device, not represented, and intermixed again at another location.

It is possible, in accordance with another preferred embodiment to seat the turning bars 01, 02 of the first or upper turning bar device 28, or also the turning bars 67, 68 of the second or lower turning bar device 66, respectively individually, i.e. each in separate frames. This individual seating is advantageous, for example, if it is intended to set a lateral registration. This takes place by changing the distance of, for example the two turning bars 01, 02, or 67, 68, from each other which respectively work with each other.

In accordance with a further preferred embodiment, the levels A, B may not be parallel with respect to each other, but are inclined toward each other at an opening angle β with an apex S and intersect in a straight track. The opening angle β of the levels A and B can be open either in, or opposite to the running direction D. Therefore, distances e and g of the levels A, B from each other, and therefore of the turning devices 28, 26, are not equal.

For the exact positioning of the turning bars 01, 02, or 67, 68 on respectively one level A or B, the frames 13 or 70 can be separated approximately centered in the area of an angle midline 92 or 93 of the angle α, and can be embodied so they can be moved apart by a distance—for example 50 mm—from each other. This can take place by operation of one or several linear drive mechanisms.

In accordance with a further preferred embodiment, the turning bars 01, 02, 67, 68 can also be supported only on one side, i.e. cantilevered.

It is advantageous if several pairs of turning devices 28, 26 are arranged on top of each other in a turning deck.

The selective displacement of each triangular frame 13 or 70 of each of the upper or lower turning bar devices 28, or 66 in the displacement direction C—i.e. transversely in respect to the running direction D—takes place by operation of the so-called motor-driven linear drive mechanism 61 or 82, which can be controlled from the printer control stand or by a computer. Sliders on the triangular frames 13 and 70 of the turning bar devices 28, 66 for separating unneeded turning bars or areas of turning bars from the compressed air supply can also be actuated from the printer control stand or by means of a computer.

While preferred embodiments of a turning bar arrangement in accordance with the present invention have been set forth fully and completely hereinabove, it will be apparent to one of skill in the art that various changes in, for example the type of material web being used, the specific type of printing press and the like could be made without departing from the true spirit and scope of the present invention which is accordingly to be limited only by the following claims.

What is claimed is:

1. A device useable to change a course of travel of webs of material comprising:

first and second turning bars located on an upper level of said device and each having a longitudinal axis, said first and second turning bar longitudinal axes enclosing a first angle and intersecting at a first intersection point; and third and fourth turning bars located on a lower level of said device and each having a longitudinal axis, said third and fourth turning bar longitudinal axes enclosing a second angle and intersecting at a second intersection point, said first and second intersection points being oriented in opposite direction.

2. The device of claim 1 wherein each of said turning bars has a semicircular cross-section.

3. The device of claim 1 wherein each of said turning bars has a circular cross-section.

4. The device of claim 1 wherein said first and second turning bars are components of an upper frame and further wherein said third and fourth turning bars are components of a lower frame, each said upper and lower frame having a tip and a base opposite said tip.

5. The device of claim 1 further including means shifting said first and second turning bars, and said third and fourth turning bars back and fourth in a displacement direction transverse to a direction of the course of travel of the web of material.

6. The device of claim 1 wherein said first and second turning bars, and said third and fourth turning bars are supported in a cantilever manner.

7. The device of claim 1 wherein said first and second angles are acute angles.

8. The device of claim 1 wherein said first and second angles are right angles.

9. The device of claim 1 wherein said first and second angles are obtuse angles.

10. The device of claim 1 wherein said first and second angles lie in a range between 85° and 95°.

* * * * *